United States Patent [19]

Moutin

[11] Patent Number: 5,892,522
[45] Date of Patent: Apr. 6, 1999

[54] METHOD AND APPARATUS FOR ADDRESSING A MEMORY AREA OF AN MPEG DECODER

[75] Inventor: Jean-Michel Moutin, Grenoble, France

[73] Assignee: SGS-Thomson Microelectronics S.A., Saint Genis, France

[21] Appl. No.: 810,944

[22] Filed: Feb. 27, 1997

[30] Foreign Application Priority Data

Feb. 29, 1996 [FR] France .................................. 96 02780

[51] Int. Cl.⁶ .................................................. G09G 5/36
[52] U.S. Cl. ........................ 345/516; 345/202; 345/517; 348/396
[58] Field of Search ................................... 345/507, 515, 345/516, 501, 202, 517; 382/232; 365/230.01; 348/384, 396, 714–718, 423

[56] References Cited

U.S. PATENT DOCUMENTS

| | | | |
|---|---|---|---|
| 5,535,275 | 7/1996 | Sugisaki et al. | 380/10 |
| 5,623,311 | 4/1997 | Phillips et al. | 348/384 |
| 5,623,314 | 4/1997 | Retter et al. | 348/714 |

FOREIGN PATENT DOCUMENTS

| | | | |
|---|---|---|---|
| A-0 553 515 | 8/1993 | European Pat. Off. | H04N 5/94 |
| A-0 696 874 | 2/1996 | European Pat. Off. | H04N 7/50 |
| A-0 710 028 | 5/1996 | European Pat. Off. | H04N 7/24 |
| A-0 714 208 | 5/1996 | European Pat. Off. | H04N 7/24 |

OTHER PUBLICATIONS

French Search Report from French Patent Application 96 02780, filed Feb. 29, 1996.

*Primary Examiner*—Kee M. Tung
*Attorney, Agent, or Firm*—Wolf, Greenfield & Sacks, P.C.

[57] ABSTRACT

The present invention relates to a method and apparatus for addressing a memory area assigned to bidirectional images from a decoder according to an MPEG standard and organized in rows of macroblocks constituted by blocks containing data relative to a group of pixels of the image, the present invention dividing each data block into a half-block of odd lines and a half-block of even lines and sequentially arranging all the half-blocks of the same type of a same row of macroblocks.

18 Claims, 6 Drawing Sheets

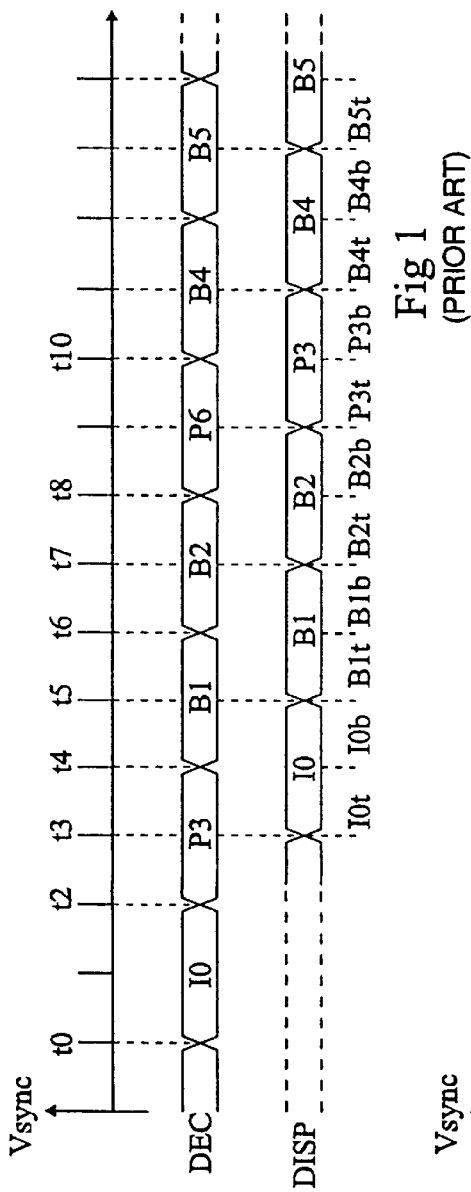
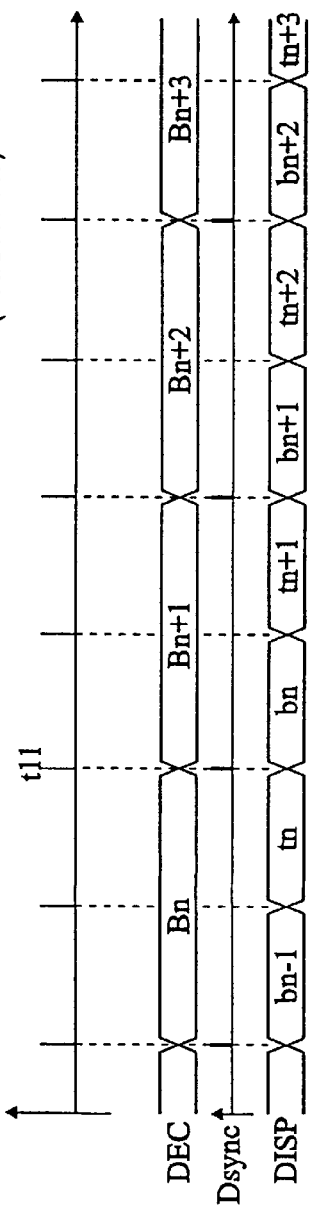
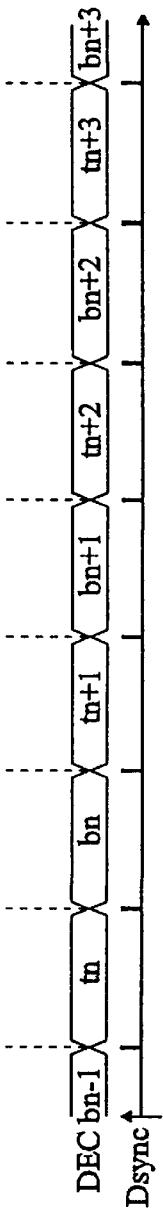
Fig 1 (PRIOR ART)
Fig 3A (PRIOR ART)
Fig 3B (PRIOR ART)

| Line | FIFO 1 MSB | FIFO 1 LSB | FIFO 2 MSB | FIFO 2 LSB | FIFO 3 MSB | FIFO 3 LSB |
|---|---|---|---|---|---|---|
| 1 | 0 | 1 | 24" | 28" | 0 | 2 |
| 2 | 2 | 3 | 32" | 36" | 4 | 6 |
| 3 | 4 | 5 | 40" | 0''' | 8 | 10 |
| 4 | 6 | 7 | 8''' | 16''' | 12 | 14 |
| 5 | 8 | 9 | 1' | 3' | 16 | 18 |
| 6 | 10 | 11 | 5' | 7' | 20 | 22 |
| 7 | 12 | 13 | 9' | 11' | 24 | 26 |
| 8 | 14 | 15 | 13' | 15' | 28 | 30 |
| 9 | 16 | 17 | 17' | 19' | 32 | 34 |
| 10 | 18 | 19 | 21' | 23' | 36 | 38 |
| 11 | 20 | 21 | 25' | 27' | 40 | 42 |
| 12 | 22 | 23 | 29' | 31' | 0' | 4' |
| 13 | 24 | 25 | 33' | 35' | 8' | 12' |
| 14 | 26 | 27 | 37' | 39' | 16' | 20' |
| 15 | 28 | 29 | 41' | 43' | 24' | 28' |
| 16 | 30 | 31 | 2" | 6" | 32' | 36' |
| 17 | 32 | 33 | 10" | 14" | 40' | 0" |
| 18 | 34 | 35 | 18" | 22" | 8" | 16" |
| 19 | 36 | 37 | 26" | 30" | 1 | 3 |
| 20 | 38 | 39 | 34" | 38" | 5 | 7 |
| 21 | 40 | 41 | 42" | 4''' | 9 | 11 |
| 22 | 42 | 43 | 12''' | 20''' | 13 | 15 |
| 23 | 0' | 2' | | | 17 | 19 |
| 24 | 4' | 6' | | | 21 | 23 |
| 25 | 8' | 10' | | | 25 | 27 |
| 26 | 12' | 14' | | | 29 | 31 |
| 27 | 16' | 18' | | | 33 | 35 |
| 28 | 20' | 22' | | | 37 | 39 |
| 29 | 24' | 26' | | | 41 | 43 |
| 30 | 28' | 30' | | | 2' | 6' |
| 31 | 32' | 34' | | | 10' | 14' |
| 32 | 36' | 38' | | | 18' | 22' |
| 33 | 40' | 42' | | | 26' | 30' |
| 34 | 0" | 4" | | | 34' | 38' |
| 35 | 8" | 12" | | | 42' | 4" |
| 36 | 16" | 20" | | | 12" | 20" |

←BFS→ (between FIFO 1 line 22 and FIFO 2)

Fig 7

METHOD AND APPARATUS FOR ADDRESSING A MEMORY AREA OF AN MPEG DECODER

BACKGROUND OF THE INVENTION

1. Field of the Invention

The present invention relates to organizing the storage of digitized images decoded according to an MPEG standard in view of their display.

2. Discussion of the Related Art

The MPEG standards set conditions for coding video images for their transmission in a compressed form. The coding according to an MPEG standard uses an estimate of motion within portions of a current image with respect to portions in one or two reference images. An image is divided into macroblocks of 16×16 pixels, to which the compression process defined by the MPEG standard is applied. On the decoder side, a flow of coded images is decompressed to be displayed.

The flow of coded images according to the MPEG standard includes three types of images. A first type of image is constituted by so-called "intra" images I which contain a coded current image. For its decoding, an "intra" image is self-sufficient. A second type of image is constituted by so-called "predicted" images P which require information relative to either a preceding "intra" or another "predicted" image in order to be decoded. A "predicted" image generally contains information relative to a difference between the current image and the preceding "intra" or "predicted" image. "Intra" images I and "predicted" images P are also called "anchor" images. A third type of image is constituted by so-called "bidirectional" images B which contain motion vectors of the current image with respect to the preceding and following "anchor" images on display.

Images I, P and B each includes a same number of decoded data enabling restoration of a whole image, should the need arise, by using a preceding and/or a following image.

To enable image display, each image, once decoded, is stored in a memory area associated with the type of image to which it corresponds. In fact, the bidirectional images B are assigned a memory area and the "intra" images I or the "predicted" images P are indifferently assigned two other memory areas, since they each play a similar role in the decoding of a bidirectional image. The three conventional memory areas have identical sizes. Each memory area is written into according to a decoding flow recording the decoded images to be displayed and is read from according to a display flow corresponding to the flow of original images prior to the coding all according to the MPEG standard.

FIG. 1 shows an example of decoding and display flows DEC and DISP, respectively, according to a vertical synchronization signal Vsync, the images being decoded and displayed according to an up-down line scanning.

A first image is constituted by an "intra" image I0 which, once decoded, is stored in a first memory area assigned to the "anchor" images. The time assigned to the decoding and the storage of an image is the display time of an image. The storage of image I0 begins at a time t0 and lasts for two vertical scanning periods, since the display generally happens in an interlaced fashion. The image which follows image I0 in flow DEC is a "predicted" image P3, the decoding of which requires information contained in image I0. Image P3 is recorded, in a second memory area for "anchor" images, for two vertical scanning periods (between times t2 and t4).

The display occurs in an interlaced fashion, that is, as far as the display is concerned, an image is divided into two fields, respectively even and odd, the even field containing the even lines of the image and the odd field containing the odd lines of the image. The even and odd fields are commonly designated as, respectively, "bottom" and "top".

The display of the first image (intra image I0) is synchronized on a time t3 which corresponds to the vertical synchronization pulse included between times t2 and t4. The display of image I0 ends at a time t5 which corresponds to the vertical synchronization pulse which follows time t4. In fact, the first field (generally the odd field I0t) of I0 is displayed between times t3 and t4, the second field (generally the even field I0b) is displayed between times t4 and t5.

In the example shown, the image to be displayed after image I0 is a bidirectional image B1. This image is stored in a third memory area assigned to bidirectional images at time t4. Indeed, the decoding of bidirectional image B1 requires the prior decoding of two "anchor" images (here, images I0 and P3). Since the display happens in an interlaced fashion, the display of the first field B1t of image B1 can start as soon as half this image has been decoded and stored in the corresponding memory area.

Image B1 is followed by a bidirectional image B2 which is stored in the third memory area between times t6 and t8. As shown at time t6, a first half (field B1t) of image B1 has been displayed, the displaying of the second field B1b of image B1 progressively and completely freeing the third memory area. The memory words of image B2 are then written over the memory words of image B1 in the third memory area which are no longer useful. After displaying image B2, image P3, which is extracted from the second memory area, is displayed. Between times t8 and t10, a "predicted" image P6 is stored in the first memory area by writing over "intra" image I0 which is of no more use. Indeed, "predicted" image P6 is decoded based on the preceding "anchor" image, that is, the "predicted" image P3 contained in the second memory area, and bidirectional images B4 and B5 which follow in flow DEC and which are to be displayed before image P6 will be decoded by means of the preceding and following "anchor" images, that is, images P3 and P6.

The different order of the images in the flows DEC and DISP results for the MPEG standards that provide that the coding of a bidirectional image (B) uses a first former anchor image (I or P) and a second following anchor image (I or P). In the flow DEC, the bidirectional image is accordingly subsequent to the second anchor image for the decoding while it must be displayed prior to this second anchor image.

FIG. 2 illustrates a conventional example of organization of a memory area for a bidirectional image. Six blocks of eight words of eight bytes of digital data (decoded) are generally associated with each macroblock of 16×16 pixels of an image. Four blocks Y1, Y2, Y3 and Y4 of 8×8 pixels contain information relative to the luminance of each pixel. Two blocks U and V of 8×8 pixels contain information relative to chrominance, a word of a block U or V being used for eight pixels. The storage of the information of an image macroblock thus occupies six memory word blocks.

A memory area is divided into two sectors, respectively S1 and S2, generally contiguous as concerns the addresses. Sector S1 contains the blocks Y of the macroblocks and sector S2 contains the blocks U and V of the macroblocks.

The macroblocks are stored sequentially according to a vertical (up-down) and horizontal (left-right) scanning of the image, in each area S1 or S2, that is, a position of a given macroblock, in the memory area, is the same whatever the image to which it belongs.

FIGS. 3A and 3B illustrate the difference between the decoding flows of a bidirectional image according to two cases of the MPEG standards. FIG. 3A shows decoding and display flows DEC and DISP, respectively, according to signal Vsync and to a synchronization signal Dsync, in the case where decoding flow DEC represents interlaced images (MPEG1 standard or so-called "frame structure" images in the MPEG2 standard). FIG. 3B shows a decoding flow DEC where the images have been non-interlaced before the coding (so-called "field structure" images in the MPEG2 standard).

In both cases, the image display is performed in an interlaced fashion, that is, the display flow DISP is the same. As concerns the display, a bidirectional image Bn is divided into two fields, respectively even bn and odd tn.

If the decoding flow DEC is interlaced (FIG. 3A), the images are stored sequentially as has been discussed in relation with FIG. 2 and the read addressing in the memory area is such that the odd lines are extracted before the even lines. This enables starting the decoding and the storing of an image, for example Bn+1 (time t11), as soon as the display of the even field bn of the preceding image Bn starts.

In the case where the decoding flow is non-interlaced (FIG. 3B), the storage occurs sequentially with respect to the data flow, that is, the odd field tn of an image Bn is stored before the even field bn. Thus, it is possible to start the storage of a following bidirectional image as soon as half (the odd field) of the preceding bidirectional image has been displayed. In a non-interlaced decoding flow DEC, the images are also divided into macroblocks corresponding to six memory blocks, but only decode data relative to lines of the same type (even or odd) that correspond to a given macroblock.

SUMMARY OF THE INVENTION

The present invention applies to organizing a memory area meant for bidirectional images. More specifically, the present invention organizes the storage of successive images in the data flow decoded by an MPEG decoder in relation to the display of the images.

The present invention aims at providing a method and a system for addressing the memory area meant for bidirectional images which enables reducing the size of the memory area assigned to the storage of these images.

The present invention also aims at providing an addressing method and system which can operate for an interlaced data flow as well as for a non-interlaced data flow.

To achieve these objects, the present invention provides a method for addressing a memory area assigned to bidirectional images from a decoder according to an MPEG standard and organized in rows of macroblocks constituted by blocks containing data relative to a group of pixels of the image, including the steps of:

dividing each data block into a half-block of odd lines and a half-block of even lines; and sequentially arranging all the half-blocks of the same type of a same row of macroblocks.

According to an embodiment of the present invention, an image is divided into macroblocks comprised of four pixel blocks and corresponding to a group of six memory blocks distributed in four blocks containing information relative to luminance and two blocks containing information relative to chrominance.

According to an embodiment of the present invention, the memory area is divided into two sectors, a first sector for the eight luminance half memory blocks of the macroblocks and a second sector for the four chrominance half memory blocks of the macroblocks.

According to an embodiment of the present invention, the size of the memory area is smaller than the size of a memory image.

According to an embodiment of the present invention, the method consists, in the recording of a current bidirectional image, in writing, row by row, over the half-blocks which have already been extracted for display.

According to an embodiment of the present invention, the data flow from the decoder corresponds to a row scanning of the image within which the macroblocks are restored sequentially.

The present invention also relates to an addressing system including an addressing device issuing, for each new row of even or odd half-blocks, the row beginning address in the memory area.

According to an embodiment of the present invention, the system includes:

a first circular addressing register for containing the addresses of the beginning of each row of half-blocks of a first image in the memory area;

a second circular addressing register for containing the addresses of the row beginnings of the half-blocks of a second image in the memory area, the first and second registers having a number of lines corresponding to the number of rows of an image;

a third circular addressing register for containing the addresses of the beginning of the half-block rows which have been extracted for display, the number of lines of the third register being at least equal to the number of macroblock rows which can be stored in the memory area; and means for switching the first register to the read mode and the second register to the write mode, and conversely, the write address of the first or second register being issued, after an initialization phase, by the third register.

According to an embodiment of the present invention, the data stored circularly in the third register correspond to the addresses issued by the first or second register.

According to an embodiment of the present invention, the datum input in the first or second register corresponds, in the initialization phase, to the result issued by a counter.

These objects, features and advantages, as well as others, of the present invention will be discussed in detail in the following description of specific embodiments, taken in conjunction with the following drawings, but not limited by them.

BRIEF DESCRIPTION OF THE DRAWINGS

FIGS. 1 to 3B, previously described, are decoding and display flows;

FIG. 7 illustrates operation of the addressing device shown in FIG. 6.

DETAILED DESCRIPTION

A characteristic of the present invention is to organize addressing of a memory area for bidirectional images by separating, in each macroblock, the odd lines from the even lines. Thus, as concerns the addressing, each macroblock is non-interlaced even when the decoding flow is of the interlaced type.

Figure 2:
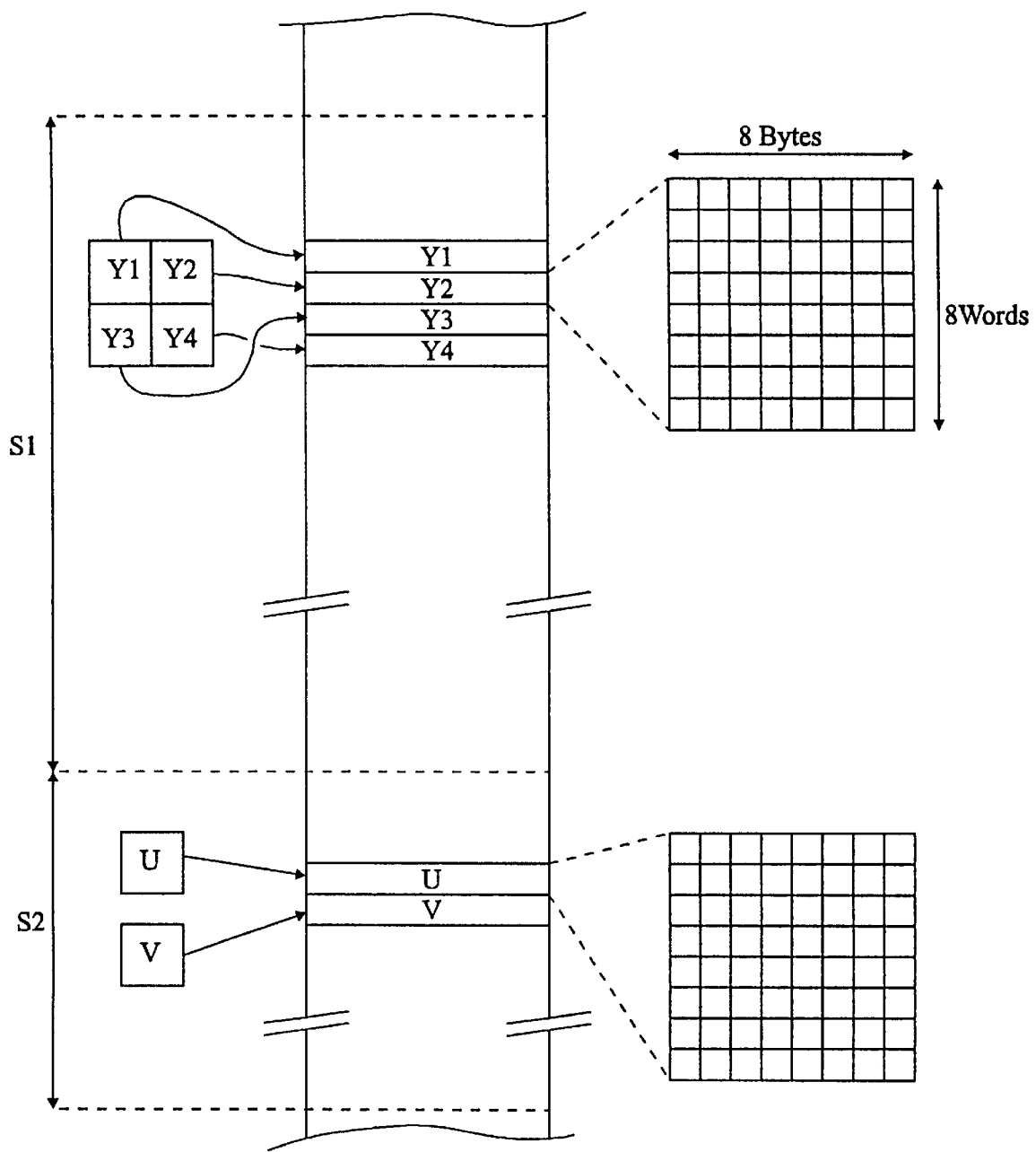
Figure 4:
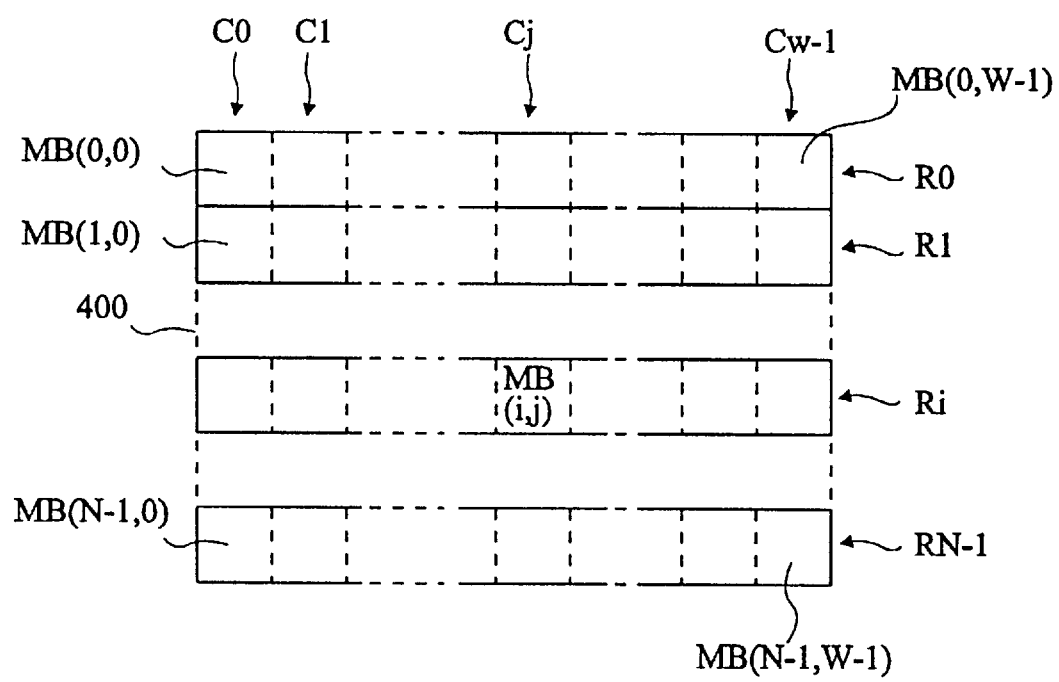
FIG. 4 schematically shows an image divided into macroblocks.

FIG. 4 schematically shows an image 400 divided into macroblocks MB. The image is divided into N rows Ri, i=0 to N−1, of sixteen pixel lines. Each row Ri includes a number W of macroblocks MB(i, j) where j=0 to W−1 and represents the macroblock rank in row Ri. The position of a macroblock is thus defined by an intersection between a column Cj and a row Ri of the image.

The present invention will first be described with an assumption that the lines are interlaced in the decoding flow (see FIG. 3A). Then, the invention will be shown to also apply to the case where the decoding flow includes, for each image, distinct odd and even fields.

Figure 5:
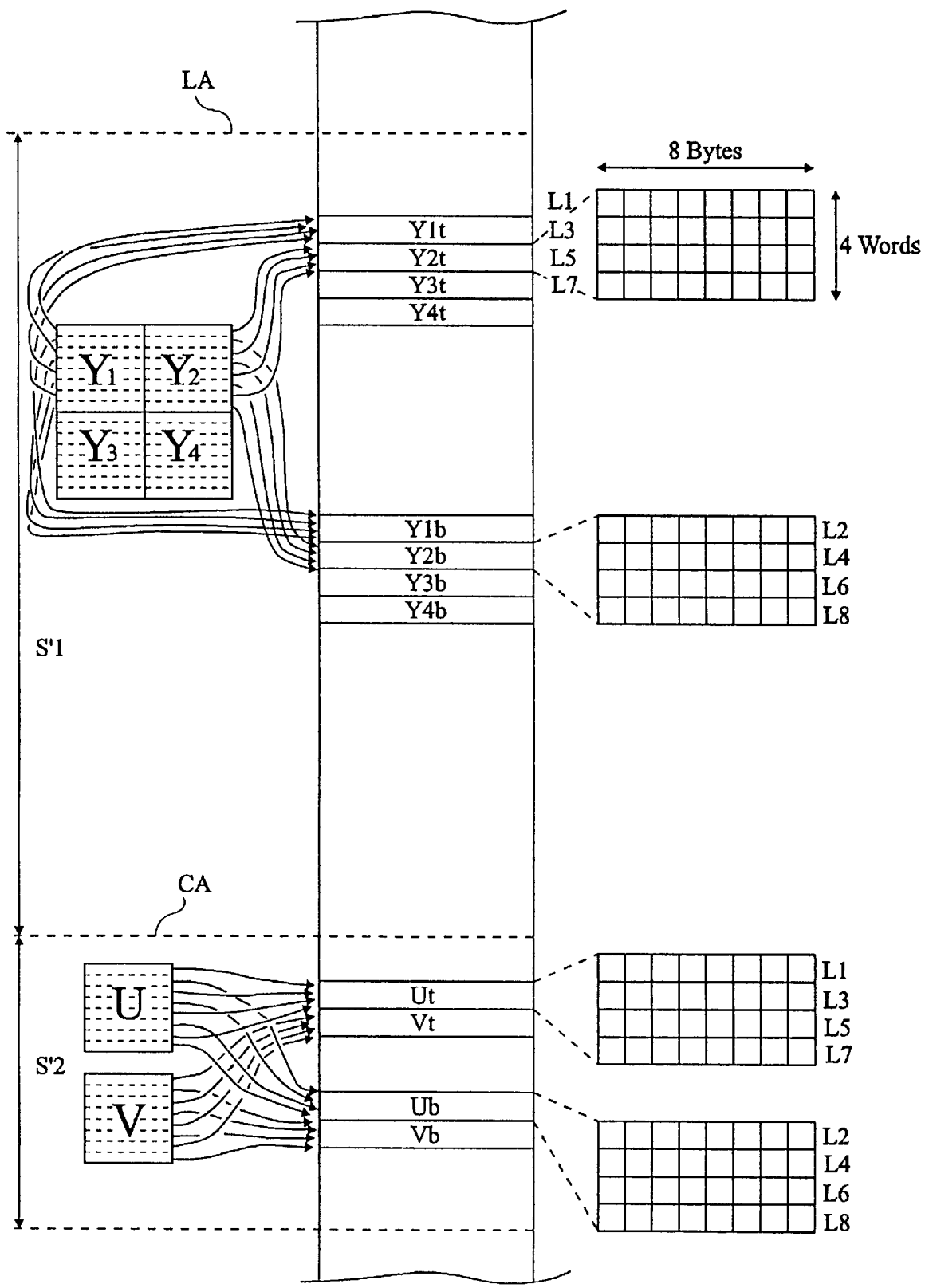
FIG. 5 illustrates organization of a memory area for bidirectional images according to the present invention.

FIG. 5 schematically shows a memory area for storing bidirectional images according to the present invention. This memory area is divided into two sectors S'1 and S'2 for storing, respectively, luminance information Y and chrominance information U and V. In the example shown in FIG. 5, the storage of an image macroblock defined by four blocks Y1, Y2, Y3 and Y4 of eight words of eight bytes containing luminance information and of two blocks U and V of eight words of eight bytes containing chrominance information is considered.

According to the present invention, each block Y1, Y2, Y3, Y4, U and V is stored in a non-interlaced fashion to obtain, in the memory, odd half-blocks Y1t, Y2t, Y3t, Y4t, Ut and Vt and even half-blocks Y1b, Y2b, Y3b, Y4b, Ub and Vb. The odd half-blocks t associated with a macroblock contain, respectively, the odd lines L1, L3, L5 and L7 of each one of blocks Y1, Y2, Y3, Y4, U and V, while the even half-blocks b contain, respectively, the even lines L2, L4, L6 and L8 of each one of blocks Y1, Y2, Y3, Y4, U and V.

Since the decoded data relative to the macroblocks arrive, in the decoding flow, according to a scanning by row Ri and the data are read, in the display flow, by field line, the set of half-blocks of the same field of a macroblock row Ri can be considered as the storage unit according to the present invention, i.e. a common unit for the two flows. Thus, the odd half-blocks of a macroblock M(i, j+1) follow the odd half-blocks of a macroblock M(i, j) in the memory and the even half-blocks of the macroblock M(i, j+1) follow the even half-blocks of the macroblock M(i, j). This unit will be called hereafter the "half-block" row.

A characteristic of the present invention is that the storage address of the half-blocks associated with a given row Ri of macroblocks varies from one image to another. Advantage is here taken of the fact that the display flow, and thus the reading from the memory area, always happens in an interlaced fashion, that is, the odd lines of the whole image are all displayed before the even lines, or conversely.

The reading from the memory area must respect the order of the data required for displaying the image.

Initially, when the memory area is empty, the odd and even half-block rows are arranged alternatively from an address LA (or CA) corresponding to the beginning of sector S'1 (or S'2) of the memory area (FIG. 5). According to the present invention, the alternate addressing is only used during the storage of the first half-block rows of a first image. Afterwards, the addresses of the beginning of a row are determined, as it will be explained hereinafter, thereby reducing the size of the memory area needed.

The memory area assigned to the bidirectional images thus is, according to the present invention, sized to be smaller than a size which would be required to store an entire image. When the alternate addressing reaches the ends of the respective sectors of the memory area, the addresses which are assigned to the half-blocks of the following row to be stored are addresses which have been freed by a reading of the sectors' contents for display.

The size of the memory area is, according to the present invention, selected to ensure that there is always a number of addresses allowing the storage of a macroblock row Ri, the contents of which can be overwritten without harming the display. The minimal size thus corresponds to a size required for the storage of the data associated with N/2+1 macroblock rows R of the image. For reasons of decoder efficiency associated with other restraints, it will however be preferred to add a margin of a few additional rows. For example, the optimal memory area for bidirectional images is, in the case of images containing thirty-six rows of macroblocks (size of the images according to the PAL standard), sized to be able to contain twenty-two rows of macroblocks.

The address of a data byte is, according to the present invention, a function of the row number Ri of the macroblock considered, the rank j of the macroblock containing the pixel in this row (column Cj), the line number in the row and of a variable FRP determined according to the invention, independently of the field type when writing, and as a function of the field type when reading.

The address of an eight-byte word relative to luminance, having its position in a macroblock MB(i, j) defined by the vertical position y (line) of eight adjacent pixels in the macroblock and by the horizontal position x of the eight adjacent pixels in the macroblock, is obtained as follows:

$$ADDL(x, y) = 32*FP + 16*(W*FRP+Cj) + 8*(y/8 \text{ modulo-}2) + 4*x + (y \text{ modulo-}8)/2, \quad (1)$$

where FP stands for the address of the beginning of the memory area assigned to bidirectional images (address LA in FIG. 5), FRP stands for the address of the beginning of the half-block row containing the word considered and Cj stands for the rank of the macroblock in row Ri (the column to which the macroblock belongs).

The address of a word relative to chrominance is, similarly, obtained as follows:

$$ADDC(x, y) = 32*FP + 8*((4*BFS+FRP)*W+Cj) + y/2) + 4*z, \quad (2)$$

where z takes the value 0 or 1 according to whether the word is a word U or a word V and where BFS stands for the number R of macroblock rows for which the memory area assigned to bidirectional images has been sized (the size of the sector S'1 reserved for the luminance information corresponds to 32*BFS*W).

To apply these formulas, it should be noted that, in this example, y takes a value from zero to fifteen and that x takes the value zero or one according to whether the eight pixels concerned correspond to the first eight or to the last eight pixels of the macroblock line, respectively.

The only variable which requires calculating to implement the present invention is the variable FRP which identifies the address of the beginning of the half-block row containing the word considered. Indeed, the other variables are available within a conventional MPEG decoder.

Figure 6:
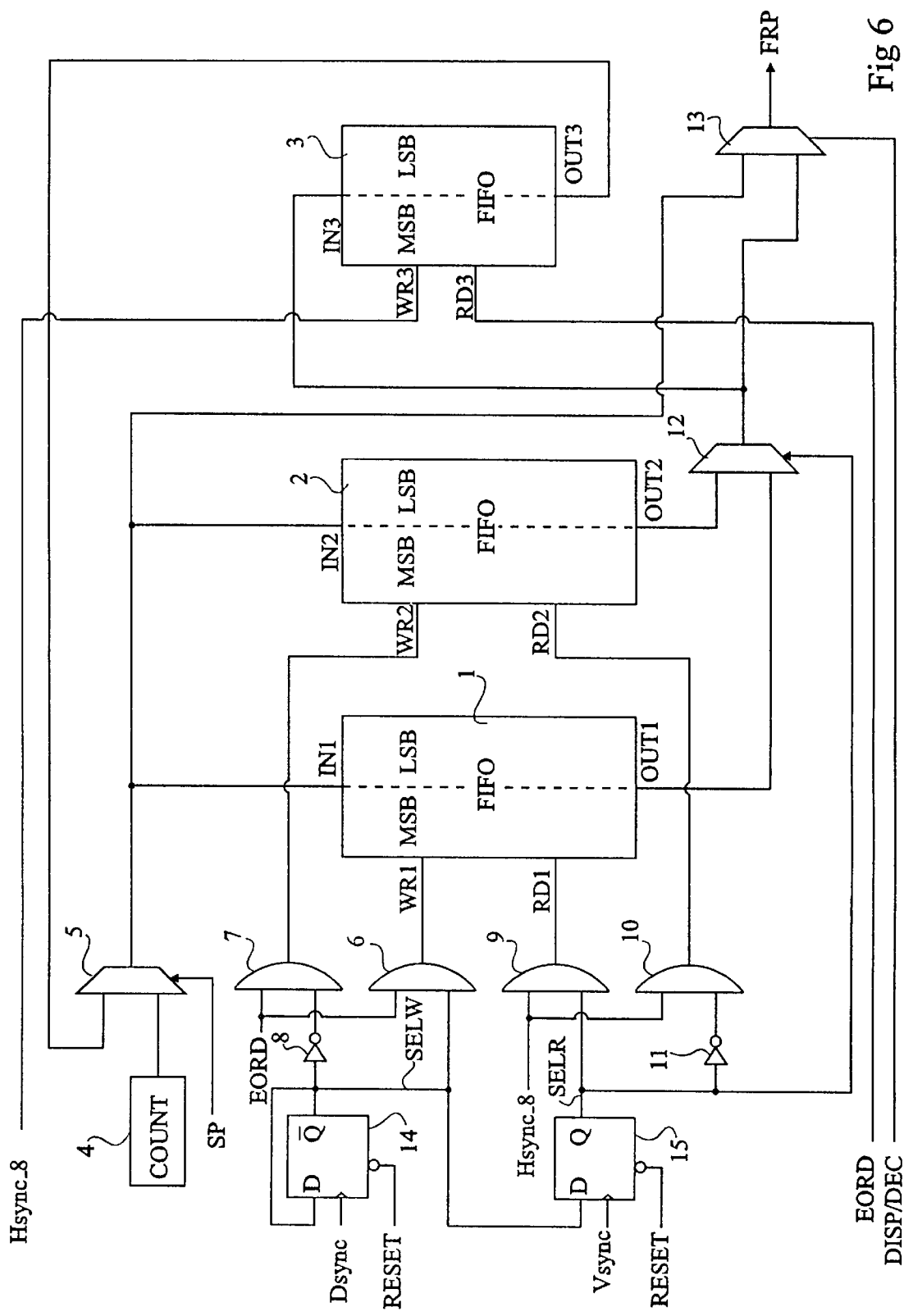
FIG. 6 shows an embodiment of an addressing device for the memory area shown in FIG. 5.

The above formulas are applied through a memory management circuit, for example by hardware. Such a circuit is integrated to the decoder. Those skilled in the art will easily modify a conventional management circuit for calculating the addresses by applying the above formulas and by taking into account the new variable FRP FIG. 6 shows an embodiment of an addressing device according to the present invention for calculating the address FRP of a half-block row in a memory area such as shown in FIG. 5. Only the device components necessary for an understanding of the present invention have been shown.

A characteristic of the present invention is its use of circular addressing registers (FIFO), the data of which correspond to the beginning address FRP of a half-block row in the memory.

Two FIFOs, respectively 1 and 2, contain the memory read addresses for display. A third FIFO 3 contains the addresses available for the writing of the data from the decoding flow.

Each FIFO 1, 2 contains a number of lines corresponding to the number N of rows R of macroblocks which can be contained in an image. FIFO 3 contains a number of lines corresponding, at minimum, to the number BFS of rows R of macroblocks which can be stored in the memory areas. Each line of FIFOs 1 and 2 contains both the address of a row of odd half-blocks and of a row of even half-blocks. The most significant bits MSB of FIFOs 1 and 2 contain the addresses of the rows of odd half-blocks while the least significant bits LSB contain the addresses of the rows of even half-blocks. As an example, value FRP is a seven-bit word and the addresses of the two half-block rows of a same row R of macroblocks are concatenated in a fourteen-bit word to be stored in one of FIFOs 1 and 2. Each line of FIFO 3 also contains two addresses of half-block rows.

FIFOs 1 and 2 are read for display to obtain the addresses of the data to be displayed. Once two rows of the same type of half-block (even or odd), that is, sixteen lines, have been displayed, their addresses are written into FIFO 3 to indicate that the corresponding data of the memory area can be overwritten. The addresses where the data of the decoding flow are to be written in the memory area are read from FIFO 3 and written into one of FIFOs 1 and 2. For a given image, only one of FIFOs 1, 2 is used. The FIFO selected changes for each new image.

The synchronizing of the read and write operations in the different FIFOs can be implemented by using, for example, logic gates combining synchronization signals present in an MPEG decoder.

During an initial phase, the addresses written in the BFS first lines of FIFO 1 are, for example, issued by a counter COUNT 4 incremented in an adapted fashion to enable the alternate addressing of the rows of odd and even half-blocks. Any other means adapted to supply the 2*BFS possible values of FRP in the memory area can be used. It should be noted that the addresses FRP can be any addresses, provided that they enable a sequential storage, from each address FRP, of all lines of a same field in a macroblock row Ri, that is, of a half-block row.

Afterwards, the addresses written in FIFOs 1 and 2 correspond to the data read from FIFO 3. For this purpose, a first multiplexer 5, the output of which is connected to data inputs IN1 and IN2 of FIFOs 1 and 2, respectively, is controlled by a signal SP indicative of a start phase. A multiplexer 5 selects the datum to be written in FIFO 1 or 2 among two inputs connected, respectively, to the output of counter COUNT 4 and to the data output OUT3 of FIFO 3.

The selection of FIFO 1 or 2 in the write mode is performed by an AND combination of a select signal SELW, controlled by a decoding synchronization signal Dsync indicating an image change in the decoding flow, and of a signal EORD indicating the end of the decoding of a macroblock row Ri. Signal SELW is positioned at the beginning of a sequence of bidirectional images by a RESET signal active to select FIFO 1. Then, SELW inverts at each synchronization by signal Dsync. For this purpose, signal Dsync is sent to a clock input of a D flip-flop 14, a $\overline{Q}$ output of which issues signal SELW. The $\overline{Q}$ output of D flip-flop 14 is connected to a D input of the D flip-flop 14. The RESET signal is applied to the initialization input of D flip-flop 14. Signal EORD is sent to a first input of each of two AND gates 6 and 7, the respective outputs WR1 and WR2 of which control the writing into FIFOs 1 and 2. Signal SELW is directly sent to a second input of AND gate 6 and, via an inverter 8, to a second input of AND gate 7.

The selection of FIFO 1 or 2 in the read mode is performed by an AND combination of a select signal SEIR and of a horizontal synchronization signal Hsync_8 which indicates the beginning of the display of a half-block row. Signal SELR is obtained by sampling and storing, on vertical synchronization signal Vsync, of signal SELW. Signal SEER is supplied by a Q output of a D flip-flop 15 which receives signal SELW on its D input, signal Vsync on a clock input and the RESET signal on a start input. Signal Hsync_8 is derived from the line-to-line synchronization signal and is sent to a first input of each of two AND gates 9 and 10, the respective outputs RD1 and RD2 of which control the reading of FIFOs 1 and 2. Signal SELR is directly sent to a second input of AND gate 9 and, via an inverter 11, to a second input of AND gate 10. Signal SELR always selects the FIFO 1, 2 which was in the write mode during the preceding field, since signal SELW is, when it changes states, delayed with respect to signal Vsync.

The data outputs OUT1 and OUT2 of FIFOs 1 and 2, respectively, are connected to the inputs of a second multiplexer 12, an output of which is connected to the data input IN3 of FIFO 3 and to a first input of a third multiplexer 13. Multiplexer 12 is controlled by signal SELR and alternatively selects the output of FIFO 1 and the output of FIFO 2.

A second input of multiplexer 13 receives the output of multiplexer 5. Multiplexer 13 issues the address FRP of the beginning of the current half-block row in the memory area. Multiplexer 13 is controlled by a signal DISP/DEC according to the task to be performed (reading or writing, that is, display or decoding, respectively) in the memory area at the address considered. Multiplexer 13 selects its first input for reading from and its second input for writing into the memory area.

The write control WR3 of FIFO 3 is performed by means of signal Hsync_8 and the read control RD3 of FIFO 3 is performed by means of signal EORD.

The operation of an addressing device according to the invention using three FIFOs for temporarily storing the addresses, be it implemented according to the example of FIG. 6 or by other means, will be functionally described hereafter.

Initially, when the memory area assigned to bidirectional images is empty, the BFS first rows R of a first bidirectional image B1 are stored sequentially in the memory area by separating the even fields from the odd fields and the row addresses of the corresponding half-blocks are stored in FIFO 1. For clarity, it is assumed that the writing into and the reading from the FIFOs start at their respective first lines. This is a mere convention with no consequences on the operation, since the addressing of the FIFOs is circular. In the following description, images of thirty-six rows of macroblocks and a memory area having a capacity of twenty-two rows of macroblocks will be taken as an example.

The display of image B1 starts, as has been discussed in relation to FIG. 3A, once approximately half the image has been stored, that is, around eighteen (N/2) rows of macroblocks. Since the display is performed in an interlaced fashion, the reading for display starts with the rows of one field, generally the odd field. When two odd half-block rows of image B1 have been displayed, their addresses contained in the seven most significant bits MSB of the first two lines of FIFO 1 are concatenated and written into the first line of FIFO 3, indicating their availability to be overwritten. When the display of the odd image field B1t starts, the system still is in the initial phase until the number of rows R decoded reaches twenty-two (BFS). The system can then read the first line of FIFO 3 and uses this data to store the following row R of the image. This process continues and the following rows R of image B1 can be stored by writing, as the display proceeds, over the odd half-block rows. In the example considered, the first row of image B1 which is written over the data is the twenty-third row (BFS+1). The odd half-blocks of the twenty-third row are written over the odd half-blocks of the first row and the even half-blocks of the twenty-third row are written over the odd half-blocks of the second row.

The corresponding addresses are, as previously, written into FIFO 1 on a same line (fourteen-bit word). Since the addressing of the FIFOs is circular, FIFO 1 contains, when full, all the addresses which have been used to store image B1. It should be noted that fourteen (N–BFS) lines of FIFO 1 contain addresses which are already present in the preceding lines.

When the entire odd image field B1t of image B1 has been displayed, the displaying of field B1b starts and the corresponding addresses which are contained in the least significant bits LSB of FIFO 1 are written, two by two, into FIFO 3. The addresses read form FIFO 3 are used for the storage of image B2 and are stored in FIFO 2. Thus, FIFOs 1 and 2 are respectively assigned to one image out of two. The odd and even half-blocks of the first row of image B2 are written over the odd half-blocks of the twenty-ninth and thirtieth rows of image B1 which had themselves been written over the odd half-blocks of the thirteenth and fifteenth rows of image B1. The corresponding addresses in the memory area are written in the first line of FIFO 2. The first even half-blocks of image B1 to be overwritten are those of the first and second rows which are overwritten by the odd and even half-blocks of the fifth row of image B2.

FIG. 7 illustrates the contents of FIFOs 1, 2 and 3 once image B1 has been entirely displayed and image B2 has been partially decoded but has not started to be displayed. FIG. 7 thus shows a "photograph" substantially at time t7 (FIG. 1) just before the beginning of the display of image B2. The numbers indicated in FIG. 7 correspond to the addresses (FRP) of the half-block rows in the memory area. These addresses have been given a ',", or "(no space)' in FIFOs 1 and 2 according to whether they are used, respectively, for the second, third or fourth time for data writing. The contents of the lines of FIFO 3 correspond to the FRP addresses read from FIFOs 1 and 2 (here, FIFO 1) during display. It should be noted that even though FIFO 3 has been shown with a number of lines higher than BFS for clarity, it is enough for it to have twenty-two lines, the low portion (in dotted lines in FIG. 7) of the FIFO 3 shown then corresponding to a second cycle where the addresses FRP (17, 19, etc.) are written over the addresses FRP (0, 2, etc.).

Once the odd image field B2t has been displayed, the displaying of the even image field B2b starts as well as the storage of the data relative to image B3. The first storage addresses of image B3 are written in the first line of FIFO 1. The read and write addresses of FIFOs 1 and 2 are reinitialized for each image beginning which is directed to them, that is, on signal Dsync for writing and signal Vsync for reading. For this purpose, write pulses are sent to FIFO 1 or 2 at the end of the storage of an image to reposition the write address at the first line, and successive readings are performed at the end of an image display to reposition the read address at the first line. FIFO 3 is reinitialized at the beginning of the storage of a first bidirectional image which follows an "anchor" image.

The writing into a FIFO 1 or 2 is performed at the end of the storage of the corresponding macroblock row Ri (signal EORD in FIG. 6). The reading from a FIFO 1 or 2 is performed at the beginning of the display of the eight half-block lines (even or odd) of the row considered (signal Hsync_8 in FIG. 6). The reading from FIFO 3 is performed at the beginning of the storage of a macroblock row Ri (signal EORD in FIG. 6). The writing into FIFO 3 is performed at the end of the display of two consecutive half-block rows (even or odd) (signal Hsync_8 in FIG. 6).

The organizing of the memory area provided according to the present invention also operates in the case where the decoding flow is non-interlaced.

In this case, two rows are processed at the same time, since the decoding flow already contains the field separation. The most significant bits MSB of FIFO 1 (or 2) are used for the odd fields and the least significant bits LSB of FIFO 2 (or 1) are used for the even fields. Thus, if the first bidirectional image of the sequence contains the data of an odd field, the bits MSB of FIFO 1 are read for display of the odd image field B1t while the bits LSB of FIFO 2 are written with the storage address of the even image field B1b. Then, the bits LSB of FIFO 2 are read for display of the even image field B1b while the bits MSB of FIFO 1 are written for the storage of the odd image field B2t, and so on.

The start phase (SP) where the two FIFOs 1 and 2 are empty can follow two different operating modes according to the storage capacity chosen for the memory area. It should be noted that an address contained in one of the FIFOs always stands for the beginning address of a half-block row, and that this row always contains the same number of memory words, whether the flow is interlaced or not.

If BFS is higher than half the number N of rows R of an image, the storage of field B1t in FIFO 1 and of the beginning of field B1b in FIFO 2 is performed sequentially until the number of rows reaches 2*BFS. Then, the reading of FIFO 3 enables the storage of the end of field B1b.

If BFS is lower than half the number N of image rows, the sequential storage of field B1t stops when the number of rows reaches 2*BFS. The reading of the FIFO 3 at the end of the storage of field B1t in FIFO 1 is delayed until the beginning of the display of field B1t. In this case, all fields B(i)t and B(i)b (besides the first B1t) start to be stored after the beginning of the display of the preceding field B(i−1)b or B(i)t (the display is made in the order B(i−1)t, B(i−1)b, B(i)t, B(i)b), but this enables a further decrease of the size of the memory area.

As concerns FIFO 3, its most significant bits MSB and its least significant bits LSB are used. Bits MSB and LSB are used to reconstruct a macroblock row of a non-interlaced image field which amounts to two consecutive half-block rows according to the present invention.

It should be noted that, when the sequence contains both interlaced and non-interlaced images, the system operation is not altered and the transitions from one mode to another do not raise any problems. Adapting the control of the three FIFOs 1, 2, 3 of FIG. 6 to enable the operation according to whether the images are interlaced or not is within the abilities of those skilled in the art according to the functional indications given hereabove.

An advantage of the present invention is that it enables considerable reduction in the size of a memory associated with an MPEG decoder. While a conventional system requires a memory area corresponding to the storage capacity of all the data of an image, the present invention enables, for example for a number BFS of twenty-two images of thirty-six rows, to use only 0.61*(BFS/N) as the size required for the storage of all the data of a bidirectional image.

The implementation of the present invention enables, notably, to decode and display an MPEG flow with images of 720×576 pixels in a 16-Mbit memory which constitutes a standard memory size whereas, in conventional systems, such a capacity is not enough.

Of course, the present invention is likely to have various alterations, modifications and improvements which will readily occur to those skilled in the art. In particular, the circuits used for implementing the addressing device can be replaced with one or several circuits performing the same function. Moreover, the sizing of the FIFO registers can be modified according to the application of the invention, in particular according to the size of the images to be stored. Further, the practical implementation of a device for implementing the present invention with three FIFO registers is within the abilities of those skilled in the art based on the functional indications given hereabove.

Such alterations, modifications, and improvements are intended to be part of this disclosure, and are intended to be within the spirit and the scope of the present invention. Accordingly, the foregoing description is by way of example only and is not intended to be limiting. The invention is limited only as defined in the following claims and the equivalents thereto.

What is claimed is:

1. A method for addressing a memory area assigned to store a bidirectional image received from a compression decoder, the bidirectional image organized in rows of macroblocks constituted by data blocks each containing data relative to a group of pixels of the image, the method comprising the steps of:
   dividing each data block into a half-block of odd type lines and a half-block of even type lines;
   sequentially arranging, in the memory area, all the half-blocks of a same type of a same row of macroblocks; and
   arranging in the memory area each row of half-blocks of a same type, independent of the type of the half-blocks previously contained in a memory row in the memory area.

2. The addressing method according to claim 1, wherein an address for a writing row in the memory area corresponds to an address selected among addresses used to store rows which have already been extracted for display.

3. The addressing method according to claim 1, wherein the bidirectional image is divided into macroblocks comprised of four pixel blocks and corresponding to a group of six memory blocks distributed in four blocks containing information relative to luminance and two blocks containing information relative to chrominance.

4. The addressing method according to claim 3, wherein the memory area is divided into two sectors, a first sector for eight luminance half memory blocks of the macroblocks and a second sector for four chrominance half memory blocks of the macroblocks.

5. The addressing method according to claim 3, wherein a size of the memory area is smaller than a size of a memory image.

6. The addressing method according to claim 5, further comprising a step of:
   in a recording of a current bidirectional image, writing, row by row, over half-blocks which have already been extracted for display.

7. The addressing method according to claim 1, wherein a data flow from the decoder corresponds to a scanning by rows of the image within which the macroblocks are restored sequentially.

8. An addressing system for addressing a memory area assigned to store a bidirectional image received from a compression decoder, the bidirectional image organized in rows of macroblocks constituted by data blocks each containing data relative to a group of pixels of the stored bidirectional image, each data block divided into a half-block of odd type lines and a half-block of even type lines and all the even type half-blocks of a same row of macroblocks sequentially arranged in the memory area and all the odd type half-blocks of a same row of macroblocks also sequentially arranged in the memory area, the addressing system comprising:
   an addressing device issuing, for each new row of half-blocks, a row beginning address in the memory area independent of the type of the half-blocks previously contained in the row corresponding to the row beginning address.

9. An addressing system according to claim 8, including:
   a first circular addressing register for containing addresses indicating a beginning of each row of half-blocks of a first image in the memory area;
   a second circular addressing register for containing addresses indicating a row beginning of each row of half-blocks of a second image in the memory area, the first and second registers having a number of lines corresponding to a number of rows of an image;
   a third circular addressing register for containing addresses indicating a beginning of half-block rows which have been extracted for display, a number of lines of the third register being at least equal to a number of macroblock rows which can be stored in the memory area; and
   means for switching the first register to a read mode and the second register to a write mode, and conversely, a write address of the first or second register being issued, after a start phase, by the third register.

10. The addressing system according to claim 9, wherein the data stored circularly in the third register correspond to the addresses issued by at least one of the first and second register.

11. The addressing system according to claim 10, wherein data stored in at least one of the first and second registers corresponds, in a start phase, to a result issued by a counter.

12. A method for addressing a memory area within which a bidirectional image received from a compression decoder is stored, the bidirectional image organized as rows of macroblocks each containing data relative to a group of pixels in the bidirectional image, the method comprising steps of:
   dividing each macroblock into an odd half-block containing odd lines of the bidirectional image and an even half-block containing even lines of the bidirectional image;
   sequentially arranging, in memory rows of the memory area, all the even half-blocks of a same row of macroblocks independent of the type of half-blocks previously stored therein; and sequentially arranging, in memory rows of the memory area, all the odd half-blocks of a same row of macroblocks independent of the type of half-blocks previously stored therein.

13. The addressing method according to claim 12, further comprising a step of:
    dividing each macroblock into half-blocks containing information relative to luminance of the pixels and half-blocks containing information relative to chrominance of the pixels.

14. A method for addressing a memory area storing a first bidirectional image received from a compression decoder in order to display the bidirectional image, the stored bidirectional image organized in rows of macroblocks constituted by data blocks each containing data relative to a group of pixels of the stored bidirectional image, each data block divided into a half-block of odd lines and half-block of even lines and all the even half-blocks of a same row of macroblocks sequentially arranged in the memory area and all the odd half-blocks of a same row of macroblocks also sequentially arranged in the memory area, the method comprising steps of:
    storing memory addresses of odd and of even half-block rows in a first FIFO register;
    retrieving memory addresses of the odd half-block rows from the first FIFO register;
    reading the data from the memory located at the memory addresses read from the first FIFO register;
    displaying the pixels relative to the data retrieved from the memory; and
    when two odd half-block rows have been displayed, writing the retrieved addresses into a second FIFO register.

15. The method as recited in claim 14, further comprising the steps of:
    retrieving a memory address from the second FIFO register;
    writing data from a decoding flow into the memory at the address location retrieved from the second FIFO register; and
    storing the memory address retrieved from the second FIFO register in the first FIFO register.

16. The method as recited in claim 14, wherein the step of storing odd and even half-block rows in the first FIFO register comprises a step of:
    during an initial phase, the addresses are written such that alternate rows of odd and even half-blocks are addressed.

17. An apparatus for addressing a memory area in which a first bidirectional image received from a compression decoder is stored, the apparatus comprising:
    a first FIFO register having an input, an output, a write control input and a read control input;
    a second FIFO register having an input, an output, a write control input and a read control input;
    a third FIFO register having an input, an output, a write control input and a read control input;
    a first circuit having a first write control output coupled to the write control input of the second FIFO, a second write control output coupled to the write control input of the first FIFO, a first read control output coupled to the read control input of the first FIFO, a second read control output coupled to the read control input of the second FIFO, a first multiplexor selection signal control output, a first input to receive a line-to-line synchronization signal, a second input to receive an end of macroblock row decoding signal, a third input to receive an image change synchronization signal, a fourth input to receive a reset signal and a fifth input to receive a vertical synchronization signal;
    a first multiplexor having a first input, a second input, a selection control input to receive a start-phase signal and an output, the first input coupled to the output of the third FIFO register;
    a counter having an output coupled to the second input of the first multiplexor;
    a second multiplexor having a first input coupled to the output of the second FIFO register, a second input coupled to the output of the first FIFO register, a selection control input coupled to the first multiplexor selection signal control output of the first circuit and an output coupled to the input of the third FIFO register; and
    a third multiplexor having a first input coupled to the output of the first multiplexor, a second input coupled to the output of the second multiplexor, a selection control input to receive a display/decode signal and an output to provide an address.

18. The apparatus as recited in claim 17, wherein the first circuit comprises:
    a first D-type flip-flop having a clock input coupled to receive the image change synchronization signal, a reset input coupled to receive the reset signal, a D input and a $\overline{Q}$ output coupled to the D input of the first D-type flip-flop;
    a second D-type flip-flop having a clock input coupled to receive the vertical synchronization signal, a reset input coupled to receive the reset signal, a D input coupled to the $\overline{Q}$ output of the first D-type flip-flop and a Q output;
    a first inverter having an input coupled to the $\overline{Q}$ output of the first D-type flip-flop and an output;
    a second inverter having an input coupled to the Q output of the second D-type flip-flop and an output;
    a first AND gate having a first input coupled to receive the end of macroblock row decoding signal, a second input coupled to the output of the first inverter and an output coupled to the write control input of the second FIFO register;
    a second AND gate having a first input coupled to receive the end of macroblock row decoding signal, a second input coupled to the $\overline{Q}$ output of the first D-type flip-flop and an output coupled to the write control input of the first FIFO register;
    a third AND gate having a first input coupled to receive the line-to-line synchronization signal, a second input coupled to the Q output of the second D-type flip-flop and an output coupled to the read control input of the first FIFO register; and
    a fourth AND gate having a first input coupled to receive the line-to-line synchronization signal, a second input coupled to the output of the second inverter and an output coupled to the read control input of the second FIFO register.

* * * * *